(12) United States Patent
Hilton

(10) Patent No.: US 12,019,317 B2
(45) Date of Patent: *Jun. 25, 2024

(54) APPARATUS FOR CONNECTING SUNGLASSES TO PRESCRIPTION EYEWEAR

(71) Applicant: Antony Hilton, New York, NY (US)

(72) Inventor: Antony Hilton, New York, NY (US)

( * ) Notice: Subject to any disclaimer, the term of this patent is extended or adjusted under 35 U.S.C. 154(b) by 472 days.

This patent is subject to a terminal disclaimer.

(21) Appl. No.: 16/679,178

(22) Filed: Nov. 9, 2019

(65) Prior Publication Data

US 2021/0141246 A1    May 13, 2021

(51) Int. Cl.
 *G02C 9/04*    (2006.01)
(52) U.S. Cl.
 CPC ...................................... *G02C 9/04* (2013.01)
(58) Field of Classification Search
 CPC .............................. G02C 9/04; G02C 2200/10
 USPC ...................................................... 351/41, 57
 See application file for complete search history.

(56) References Cited

U.S. PATENT DOCUMENTS

| | | | | | |
|---|---|---|---|---|---|
| 2,953,968 | A | * | 9/1960 | Hoffmaster | G02C 7/16 351/48 |
| 3,600,069 | A | * | 8/1971 | McNeill | G02C 9/04 351/47 |
| 5,880,805 | A | * | 3/1999 | Naessens | G02C 9/04 351/59 |
| 6,280,029 | B1 | * | 8/2001 | Salk | G02C 9/04 351/47 |

* cited by examiner

*Primary Examiner* — Tuyen Tra

(57) ABSTRACT

The claimed invention is a device that attaches to sunglasses and allows the sunglasses to connect to prescription eyewear so that the sunglasses can be placed on the face over prescription eyewear. The main components of the invention include a mechanism for attaching to sunglasses, and a mechanism for hooking or otherwise connecting to prescription eyewear, so that the sunglasses can be connected by the invention to prescription eyewear via the hooking mechanism. The invention is detachable, interchangeable between sunglasses, and can be made of material that would allow its configuration to be adjustable.

19 Claims, 10 Drawing Sheets

APPARATUS FOR CONNECTING SUNGLASSES TO PRESCRIPTION EYEWEAR

CROSS REFERENCE TO RELATED PATENTS

Not applicable

U.S. GOVERNMENT SUPPORT

Not applicable.

BACKGROUND OF THE INVENTION

Area of the Art

DESCRIPTION OF THE BACKGROUND

Currently, there is no removable, adjustable mechanism that attaches to sunglasses and would allow any form of regular sunglasses, having no prescription, to be placed on the face of an individual and over prescription eyewear worn by the same individual by connecting the sunglasses to the prescription eyewear.

Presently available are various forms of solutions (a) which allow an individual to either wear specially molded sunglasses over, and encasing, existing prescription eyewear, (b) which allow tinted glass or plastic to be clipped onto the frame of prescription eyewear ("clip-ons") so that they attach to the prescription eyewear frame and lie over the prescription lens, (c) comprise chemical and other material additives integrated into the prescription lens so that the lenses tint when light intensity in the surrounding environment increases, and (d) such as prescription sunglasses.

The foregoing current solutions provide limited choices in purchasing sunglasses, generally exclude all branded and popular sunglasses as they are not constructed to fit over and onto prescription eyewear. For instance, the encasing sunglasses are a specialized item, though in the market, they have a limited market appeal and limited aesthetic. They are bulky and limited in their shape, requiring particular specifications as to design so that they may properly cover most, not all, prescription eyewear, and lack variety in styles, possible as a consequence of the bulk. Clip-ons can come in different sizes and shapes, giving the appearance of style. The mechanism by which they work also varies, including clips, hooks and magnets that grasp/grab/connect the frame, so that tinted glass, plastic or other material lies over the prescription eyewear lenses. Such clip-ons are specially crafter, are limited to the style in which they are formed, and may (such as, but not limited to, the example of magnetic clip-ons) require the prescription eyewear frames to have a construction that will accommodate. Additionally, clip-ons must be handled and stored separately when not in use, and are usually not available under brand name styles unless specifically made for brand name prescription eyewear, and do not offer the individual choice of brand name style. Moreover, for the specialized clip-ons (such as, but not limited to, certain magnetic clip-ons), they are only useable with prescription eyewear to accommodate their functional design. The self-tinting glasses cannot be prevented from tinting indoors where there may be bright light, nor can they be easily switched for alternative styles, and nor do they allow for alternative sunglasses styles as the lenses are cut for the specific frame. Finally, prescription sunglasses must be used and stored separately, and switched for prescription eyewear on the face, which does not accommodate changing the style unless a new pair of prescription sunglasses in the preferred style is purchased.

Additionally, except for the encasing sunglasses and the prescription sunglasses, the various solutions offered such as those others described above are connected to the prescription eyewear and cannot be used without prescription eyewear; whereas the invention here connects to the sunglasses. The former two solutions—encasing sunglasses and prescription sunglasses—are also additionally limited in that the encasing sunglasses provide little in the form of style variety, are constructed only for the intent to use over prescription eyewear and may not fit over certain prescription eyewear; and prescription sunglasses prevent interchangeability between styles of sunglasses, and the lenses require changing as prescription changes. The invention here is designed and formed to be removable from the sunglasses so that it can be interchanged between different styles of sunglasses, despite the form/design of the sunglasses frame or the frame of the prescription eyewear, and changing prescription is never a consideration.

SUMMARY OF THE INVENTION

The claimed invention differs significantly from currently available sunglass solutions for prescription eyewear users. Current sunglass solutions offer limited choices in the brand names and styles that can be worn, and either require bulky overlays, tinted glass that clips or connects onto the prescription frame, expensive chemical additives to the lens, and an extra pair of prescription eyewear (which can include brand name styles offered in the market with prescription lenses made specially for the frames) which must be switched for the prescription eyewear when used.

By utilizing the claimed invention, an individual can purchase any style of sunglasses they prefer and place them over the prescription eyewear that the individual wears, relieving the need to remove the prescription eyewear for non-use storage, and submitting to limited styles available that can accommodate the wearer's prescription eyewear frame. The invention clips onto the sunglasses and hooks the sunglasses onto the prescription eyewear when put on, at the bridge of the prescription eyewear. The invention clasps onto the sunglasses frame, at the nose bridge area, and protrudes a non-dangerous, adjustable hook, extending toward the individual's face, at an angle. When this hook is attached to the sunglasses, the wearer may place the sunglasses over the prescription eyewear to cause the hook of the device to rests on and grasp the bridge of the wearer's prescription eyewear. The prescription eyewear then supports the sunglasses so that it will remain in place over the prescription eyewear, and not fall or slide down the bridge of the nose of face of the wearer.

The invention is not a permanent attachment to the sunglasses. It can be removed and placed on another pair of sunglasses as desired by the wearer, allowing the wearer to select any style of sunglasses for use with the device and over existing prescription sunglasses.

By the use of this invention, the individual is permitted to purchase any style of sunglasses they please and use them over the individual's existing prescription eyewear, and switch between any different style of sunglasses as the device is removable.

DESCRIPTION OF THE FIGURES

FIG. 1(a) depicts the invention formed from bent resilient wire, although any material can be used, and where mirrored left and right formations are connected by a torsion bridge that also presents as the hooking mechanism for the invention. FIG. 1(b) depicts the invention formed in 1a with an additional material encasing the legs and feet of the invention as an additional and alternative representation of the invention;

DETAILED DESCRIPTION OF THE INVENTION

Figure 1:
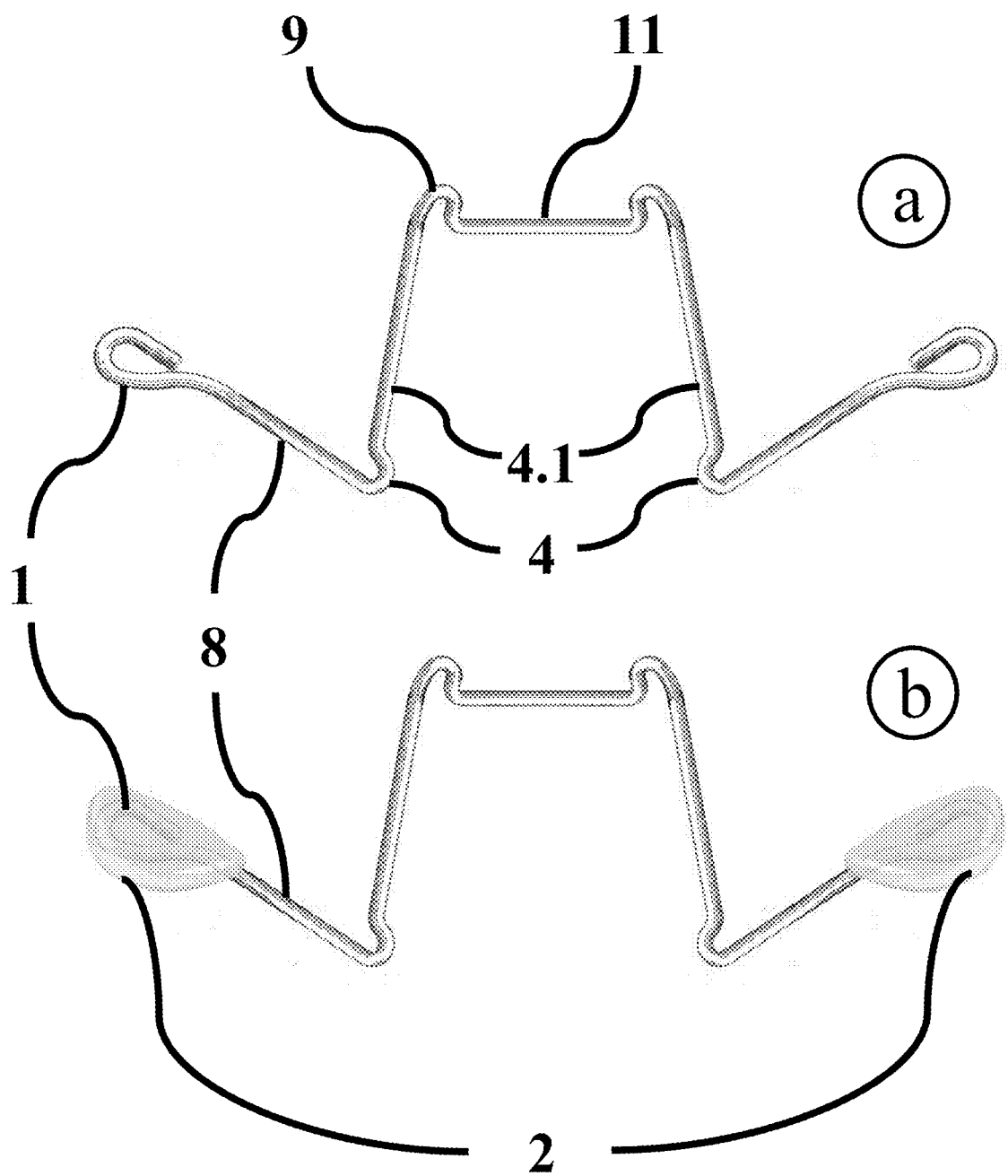
FIG. 1 shows a view of an embodiment of the invention from either the front or rear perspective.

The following description is provided to enable any person skilled in the art to make and use the invention, and sets forth the best modes contemplated by the inventor of carrying out his inventions. Various modifications, however, will remain readily apparent to those skilled in the art, since the general principles of the invention have been defined herein specifically to provide a readily removable solution for allowing an individual to place the invention onto any sunglasses and place sunglasses having the device connected to them over prescription eyewear.

Current inventions used to provide sunglasses solutions for prescription eyewear all suffer from inherent design flaws that reduce their usefulness and versatility. There are sculpted sunglasses, which are wide, bulky and hollow overlays that are sculpted frames shaped large enough and hollow enough to encase an individual's prescription eyewear when placed on the face. While such an invention (potentially) allows the wearer to use these sunglasses over any prescription eyewear (except where the prescription eyewear frame may be too large for the hollowed area of these specialized sunglasses), the wearer is limited to only those sunglasses and cannot exchange them for others unless they are sunglasses of similar structure. They are a specialty item (not as widely available as standard sunglasses), and offer limited designs for aesthetic preferences of the wearer. Another invention currently used are tinted lenses that clip onto the frame of the prescription eyewear ("clip-ons"). This invention is also a specialty item (also not as widely available as standard sunglasses). It can be similarly limited in that, if they are shaped to a particular form of prescription eyewear frame, they cannot be used with other prescription eyewear frame forms; if they clip onto the "bridge" of prescription eyewear frames (that torsion bridge structure above the nose of the wearer, which connects the left and right portions and lenses of the prescription eyewear and/or the frames that hold them), the clipping mechanism may not be able to clip onto all prescription eyewear frames (if the frames, and therefore the bridge, are too thick for the clip); if the clip-ons are formed with little hooking clips, they are limited only to frames similarly shaped as the clip-on; and if the clip-ons connect to the prescription eyewear using magnets, the prescription eyewear frames must have specialized frames to receive the magnets. Additionally, in all instances of the clip-ons, they are accessories to the prescription eyewear themselves, usable only with prescription eyewear, and are not available in the mass-market styles and brands generally sought and purchased by consumers. Another invention currently used are prescription lenses which tint based on the light intensity of the environment in which the wearer is located (i.e. if the wearer is indoors with normal lighting, there is no tint; if the wearer is outside in the full sun, the light intensity will cause the chemical or structural treatment of the prescription lenses to tint). The limitation here is that the wearer does not use a separate pair of sunglasses. Another invention is to purchase designer and/or brand name sunglasses with prescription lenses. The limitation of this form is that the wearer must exchange the non-prescription tinted lenses with prescription versions, and the prescription eyewear must still be exchanged for the prescription sunglasses and separately store away while the sunglasses are used.

The claimed invention addresses the foregoing deficiencies and allows the individual to purchase any sunglasses of any style or brand name and place them over their prescription eyewear (and frame). It is reusable and interchangeable among different sunglasses, inexpensive enough to be disposable, and it can accommodate any form or style of sunglasses and prescription eyewear. This invention is easily placed and removed by the individual user, and it allows a person to wear any style or size or shape of sunglasses over existing prescription eyewear, to allow the individual to use their prescription eyewear in conjunction with the selected and/or preferred sunglasses in any environment. This type of invention does not require any alteration to, nor does it require that it be a permanent part of, the sunglasses or the prescription eyewear.

The invention can be formed by bending resilient wire like that used for traditional metal papers clips, or other material that is both resilient and pliable. Rather than attempting to provide a detailed structural description without background, the invention will be broken down herein into a number of structural-functional domains which will allow ready understanding of the invention.

Figure 2:
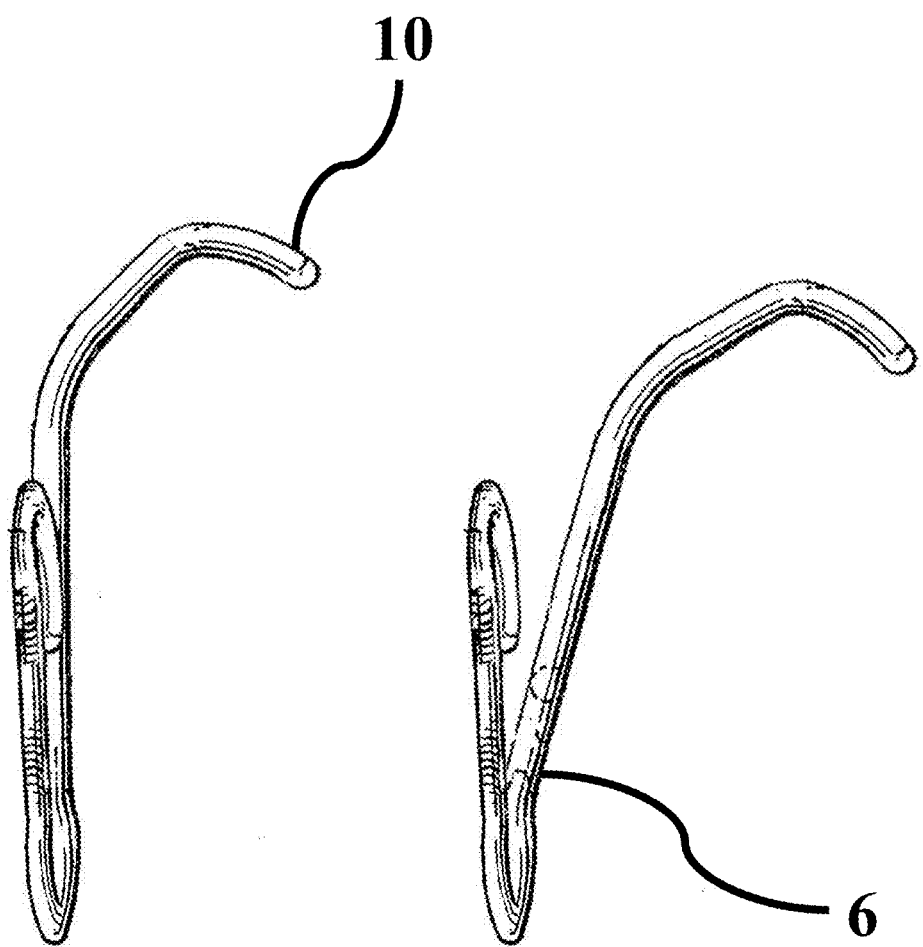
FIG. 2 shows a side view of the embodiment depicted in FIG. 1, with the hooking mechanism in a neutral position as well as a bent forward configuration.

FIG. 1 represents an idealized version of the invention, from the front or rear; FIG. 2 offers the same idealized version, but from a side view. Presented in FIG. 1 is the molded resilient wire in FIG. 1a. FIG. 1b presents the same representation with added material at the "feet" of the invention. This added material can be a soft and rubbery material, enhancing the amount of surface area the feet of the device at [1] may touch on the sunglasses lens or frame.

Figure 3:
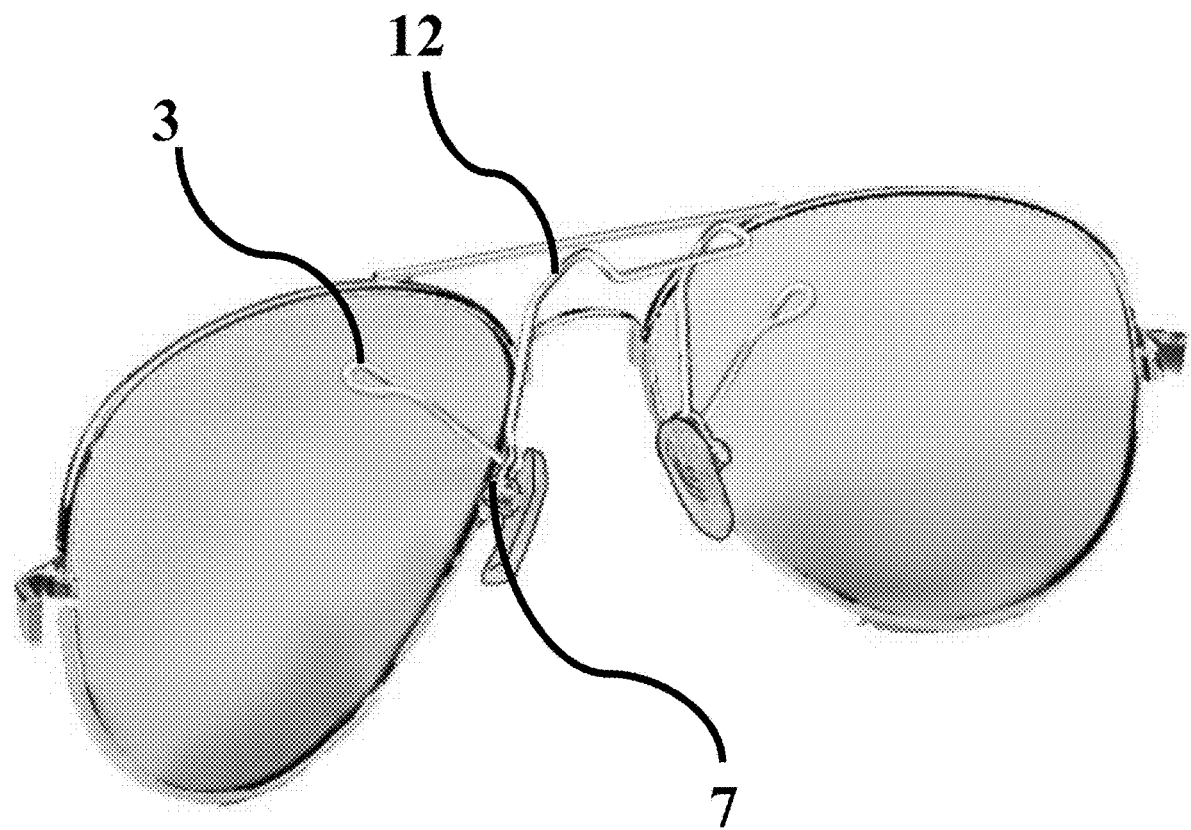
FIG. 3 shows the embodiment of FIG. 1 attached to a pair of sunglasses at the nose pad arms of sunglasses having such a feature.

The invention in FIG. 1 is molded in such a way as to be attached and fixed on sunglasses, such as depicted in FIG. 3. At the outer ends of the invention depicted in FIG. 1, the resilient wire can be bent in a hoop shape (said hoop taking any shape) referred herein as a "counter" (which can be closed or non-closed) as depicted at [1] of FIG. 1; though a counter is not required, and the feet can also have a bend referred to herein as a "serif", or it can simply end at a straight terminal point. This part of the invention is referred to as the "feet" [1], and exist at mirrored ends of the invention. The feet can be exposed as shown at [1], the whole of the resilient wire wrapped or encased in a "skin" of material or covering made of material, or alternatively the feet alone can be encased in a material such as or similar to as depicted at [2] in FIG. 1b. This material can be shaped in a round or teardrop form, or any other form that would support or enhance the invention; it can be shaped to be flat on one side to maximize surface area touched on the sunglass lens or frame; it can be made of a material that is lightly adhesive, or have an adhesive applied to the exterior of the material, so that the invention can stick to the sunglasses lens or frame to aid or enhance the invention's function.

Figure 4:
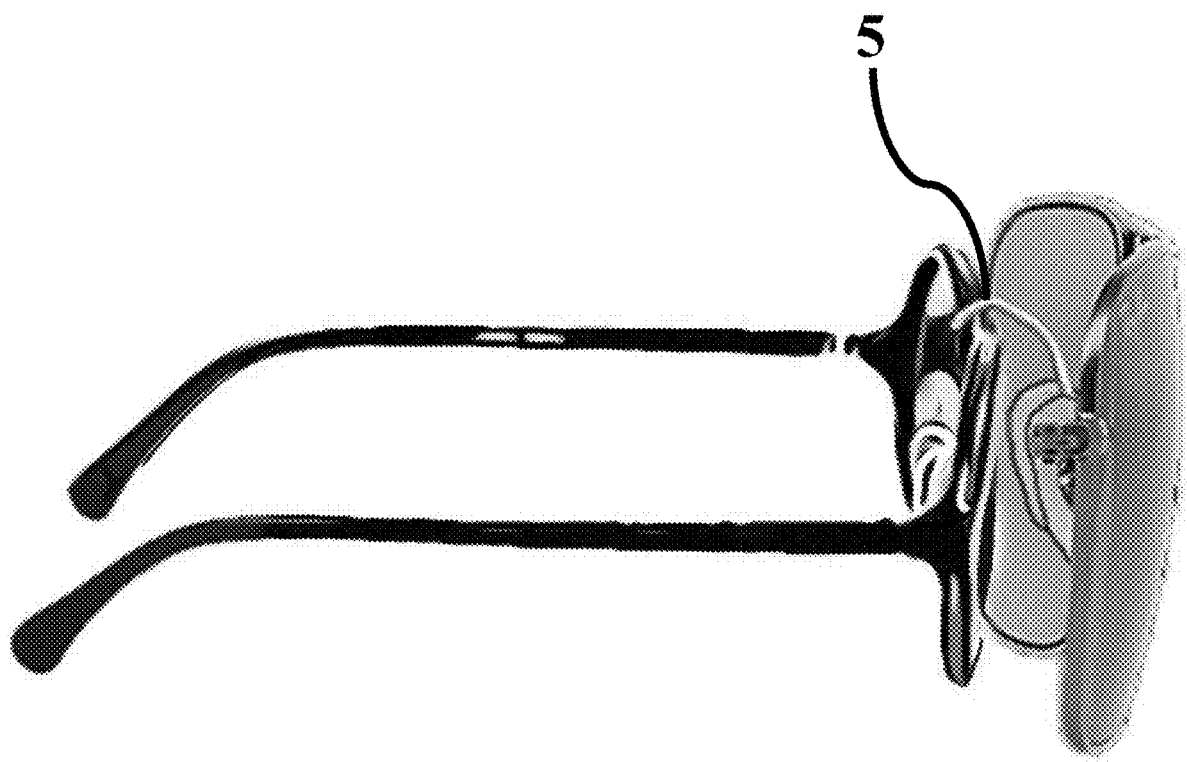
FIG. 4 shows and embodiment of FIG. 3 being placed over, and the invention hooking onto, the frame of a prescription eyewear.

The feet of the invention are what braces the invention against the sunglass lens or frame, such as depicted in FIG. 3 at [3]. (FIG. 3 depicts the feet at [3] without the material encasing the feet as depicted in FIG. 1b at [2]). As described, this is one version of the invention, which can be used without the material, but this is by no means a limitation as to how this invention may be formed, which, as described above, can include the material or alternatively a "skin" wrapping around the resilient wire, or any other embodiment that can either support or enhance the invention's function). This bracing against the sunglass lenses at [3] helps to secure the invention to the sunglasses as the "hook" of the invention is caused to grasp onto the bridge of prescription eyewear, as shown in FIG. 4 at [5] (and to be described herein later). This bracing can be enhanced by the material shown at FIG. 1(b) at [2] added to the feet. This bracing is performed by the invention in conjunction with a clasping mechanism at the "knees" of the invention depicted in FIG. 1(a) at [4], which will be described.

The knees of the invention are a bent formation of the resilient wire bent at each at the baseline of the invention. This bending configures to create an L shape, where the corner of the L shape forms the knees as shown in FIG. 1a at [4] and FIG. 2 at [6]. This knee bending is configured in such a way as to create a mechanism that allows the invention to clasp onto protruding structures of the sunglasses. The clasping mechanism of the knees can take any shape, such as a simple rounded or squared non-closed counter, similar to as shown in FIG. 1a at [4] and FIG. 2 at [6]. This non-closed counter depiction is an idealized form as it provides the best possible method (but not the only method) for the invention to clasp to the sunglasses, remain secure in its attachment to the sunglasses so that it will not fall of the sunglasses frame, and to perform the function intended.

The knees generally clasp onto protruding elements of the sunglasses such as, for example, the wire branches extending from the sunglass frame (at or near the sunglasses frame bridge) which hold the nose pads that rest on the nose (referred to as the "nose pad arms"), as depicted in FIG. 3 at [7]. The invention is slid under and past the nose pads so that the stems (extending down from the hook to the knees) of the invention as depicted in FIGS. 1a and 1b at [8] are between the sunglasses lenses and the nose pads and nose pad arms. The invention is raised up between the sunglasses lenses and nose pad arms until the nose pad arms pass through the gape of the non-closed counter of the knees, and enter into the negative space within the non-closed counter (the "bowl"); which causes the invention to clasp onto the nose pad arms (usually at the upper part that connects to the sunglasses frame, though this would not be a limitation for the clasping) of the sunglasses. In the idealized version of the knees of the invention, the invention will click into place. The feet braced against the sunglasses lenses help to brace the invention against the nose pad arms so that, between the clasping of the knees on the nose pad arms, and the bracing of the feet against the sunglasses lenses, the invention will secure onto the sunglasses, and prevent it from falling off the sunglasses, or from moving around. Ideally, some movement can take place, in that the invention can be slightly adjusted in placement, but a firm brace by the feet and clasp at the knees are also advantageous to the intended use of the invention.

From the knees, the resilient wire is bent upward to form the stems (FIG. 1(a) at [4.1]) which extend to form the hook of the invention. At the top of the stems, the hook is formed from the resilient wire by bending the wire to form arms as depicted at [9] of FIG. 1a, which bend perpendicularly from the stems as depicted in FIG. 2 at [10]. This bend in the resilient wire of the invention creates the "hook" and the throat of the hook. The point of the hook is the torsion bridge, which acts as a cross bar connecting each of the mirrored sides of the invention, such as depicted in FIG. 2 at [11]. This hooking structure (which is also the link to the mirrored side of the invention, FIG. 1a at [11]) is what is used by the invention to connect the sunglasses to the prescription eyewear and cause it to stay in place over the prescription eyewear.

The hook depicted in FIG. 1a at [11] and FIG. 2 at [10] extends and curves (or bends) forward from the knees (or is caused by the wearer to bend forward by manipulation of the pliable resilient wire material through the use of pressure applied by the fingers of the hand) as depicted in FIGS. 2 [6] and [10], and away from the sunglasses frame as depicted in FIG. 3 at [12], so that it can reach the frame of the prescription eyewear and rest upon the prescription eyewear bridge—that length of frame on prescription eyewear commonly referred to as a "bridge", which is located between the lenses of the prescription eyewear, connects the frame of the left part of the glasses to the frame of the right part of the glasses (or possibly the left and right lenses, if the prescription eyewear are what is referred to as "frameless" or "rimless", which refers to prescription eyewear formed without frames to hold the lenses), and is located above the bridge of the wearer's nose when worn; where the prescription eyewear bridge enters the throat of the hook of the invention. This hooking onto the bridge of the prescription eyewear is depicted in FIG. 4 at [5]. It is when the bridge of the prescription eyewear enters the throat of the hook that the invention connects and secures the sunglasses to the prescription eyewear.

The height of the hook can vary, to accommodate the distance between the sunglasses and the prescription eyewear which can vary because of certain elements inherent in the sunglasses, the prescription eyewear, and the wearer's head. Different sunglasses have different structural molds and formations. The width, length and thickness of the frame, and the location of the nose pad arms, to cite a few examples (and this is by no means an exhaustive list of examples), can affect the distance the hook must extend to reach the prescription eyewear on the wearer's face. Similarly, the structural form of the prescription eyewear can also affect the distance the hook must extend to reach the prescription eyewear. For instance, the outer corners of the prescription eyewear, where the joints (corner connector) of the ear stem (those parts of prescription eyewear that extend from the main frame holding the lenses and rest on the ears) are located, can cause the center of the sunglasses (where the nose would be located), and therefore the invention and its hook, to be pushed further away at the prescription eyewear (again, this is not an exhaustive list of examples). Also, the form and configuration of the wearer's face can affect the distance the hook must extend to reach the prescription eyewear—i.e. the width of the wearer's face, the height of their ears or the size of their nose can all have an affect (again, this is not an exhaustive list of examples). This is why having a hook of varying length can be beneficial, to ensure that when the invention is attached to the sunglasses (as depicted in FIG. 3 at [7], and braced by the feet at [3] of FIG. 3), the hook will be able to extend enough to rest on the bridge of the prescription eyewear (as depicted in FIG. 4 at [5]).

FIG. 2 offers an idealized shape of the hook of the invention. This shape, depicted at [10] of FIG. 2, creates a throat into which the bridge of the prescription eyewear may be grasped by the invention, as shown in FIG. 4 at [5], when it rests on the prescription eyewear. This extension and curve secures the connection between the sunglasses and the prescription eyewear, and prevents the invention from slipping off the prescription eyewear; which prevents the sunglasses from falling away.

In an idealized version of the invention, the resilient wire used will be pliable, allowing for the hook to be adjustable. Adjustments perceived in the idealized version of the invention would allow the hook to be bent at the knees away from the sunglasses (as depicted in FIG. 2 at [6], showing the hook bent forward toward a wearer's face and to the prescription eyewear) and bent back to be located in the planar plain of the invention (as depicted by FIG. 2 at [10]).

This ability for the resilient wire to be bent by the wearer can be beneficial in that allowing the hook to bend forward and back allows the wearer to adjust the invention so that the hook will reach the bridge of the prescription eyewear. This ability to bend the hook has the added advantage of allowing the wearer to adjust how far away the sunglasses will be from the prescription eyewear, and how far up or down the sunglasses will sit over the prescription eyewear. It has the added advantage of allowing the wearer to adjust how far over and/or above the bridge of the wearer's nose the sunglasses will reside, and/or where on the bridge of the wearer's nose the sunglasses nose pads will sit.

Once the invention is connected to the sunglasses, it can remain connected to or removed from the sunglasses at the option of the wearer. Removal allows the device to be interchanged between different sunglasses, allowing the wearer to buy any brand of sunglasses which may be worn over prescription eyewear.

While the form provided in FIGS. 1a, 1b and 2, and as described in the previous paragraphs are an idealized version of the invention, the shape depicted and described are by no means the sole shape the invention may take. Other formations and shapes of the invention are also claimed in the alternative, to the extent that they function in the same or similar way as described herein: the invention device attached to the sunglasses in such a way as to allow any sunglasses to be placed over, and connected to, prescription eyewear by the hook described herein.

Figure 5:
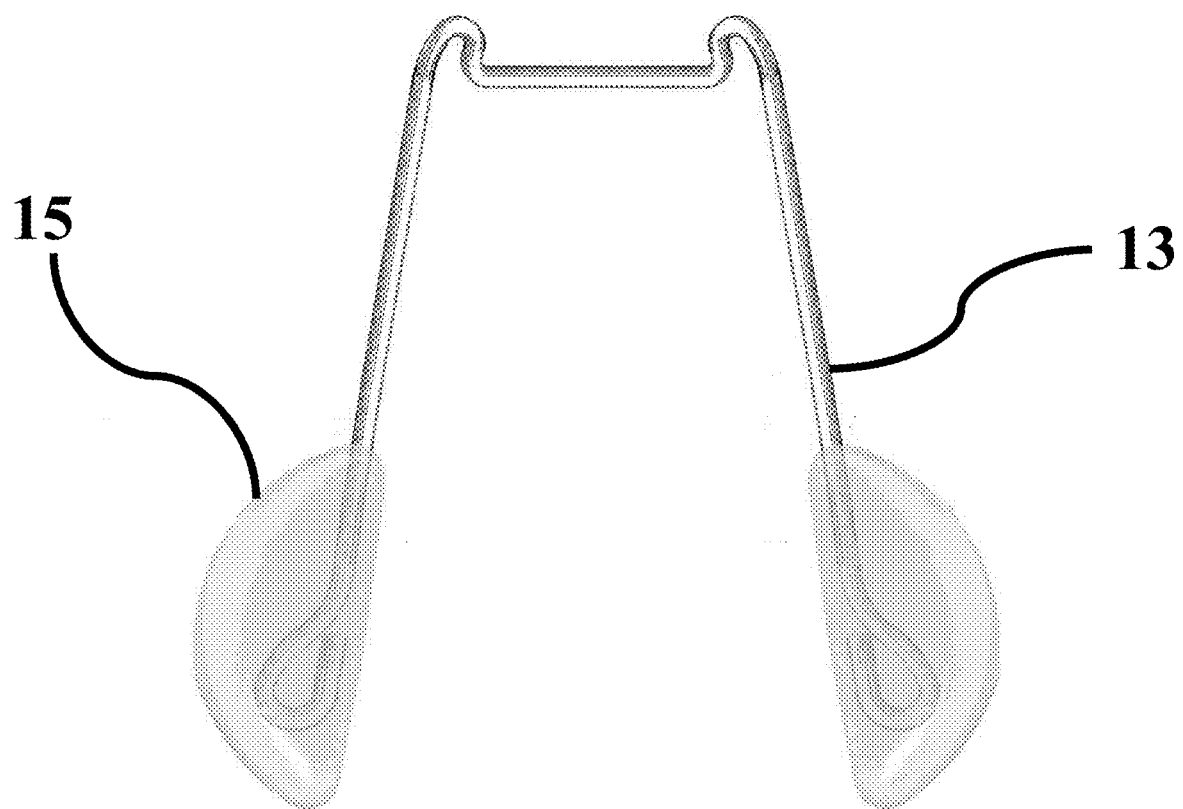
FIG. 5 shows an alternative embodiment of the same invention depicted in FIG. 1, in a slightly different configuration, with material encasing the legs and feet of the invention.
Figure 6:
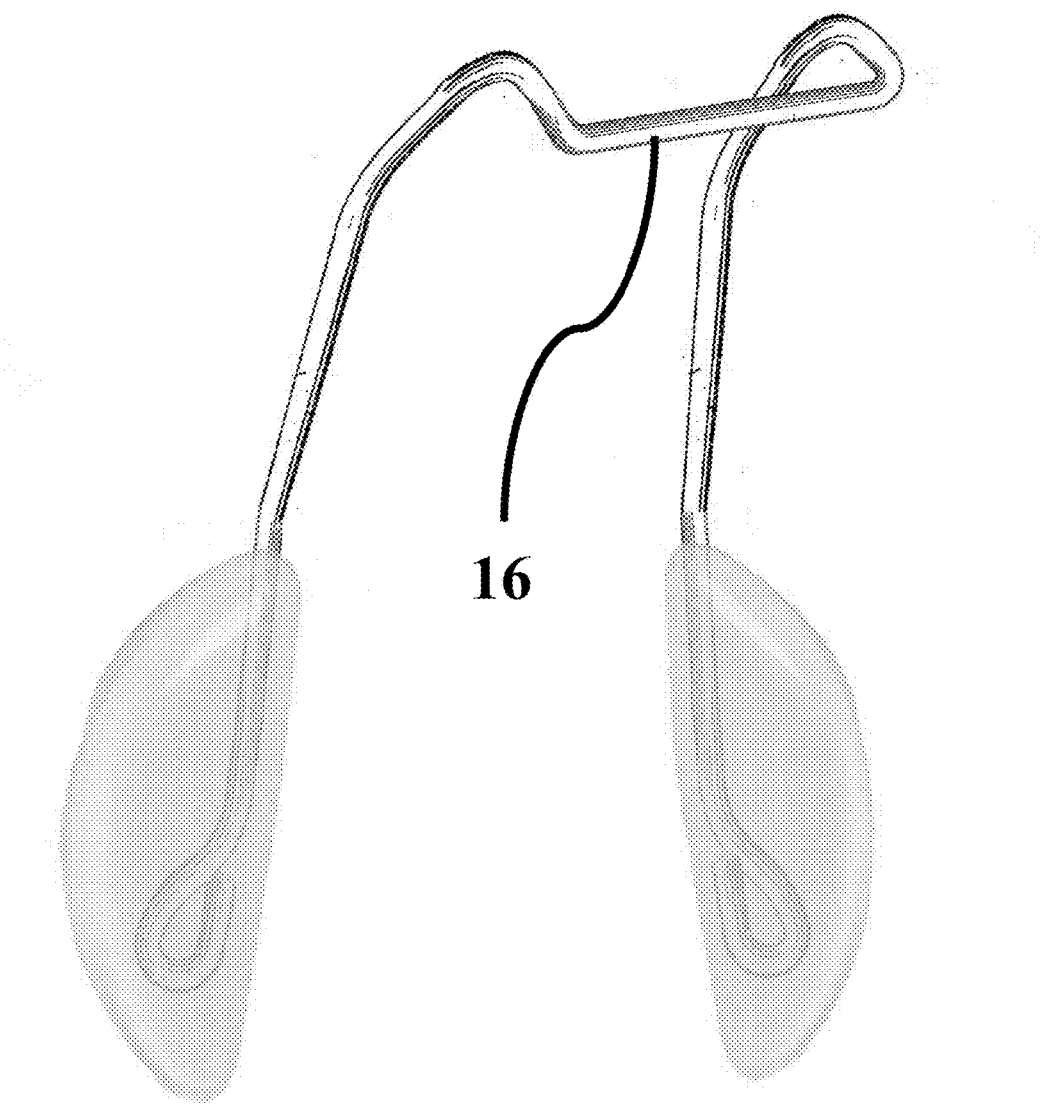
FIG. 6 shows the invention in FIG. 5 from a three-quarter angle.

FIGS. 5 and 6 show alternative embodiment of the invention that is claimed, configured for sunglasses with frames that have no nose pad arms, or may have frames too thick for wearing the sunglasses in an aesthetically pleasing manner over the prescription eyewear. In some instances, for example, a sunglasses frame may have the nose pads molded into the frame, rather than attaching arms that would hold nose pads.

Figure 7:
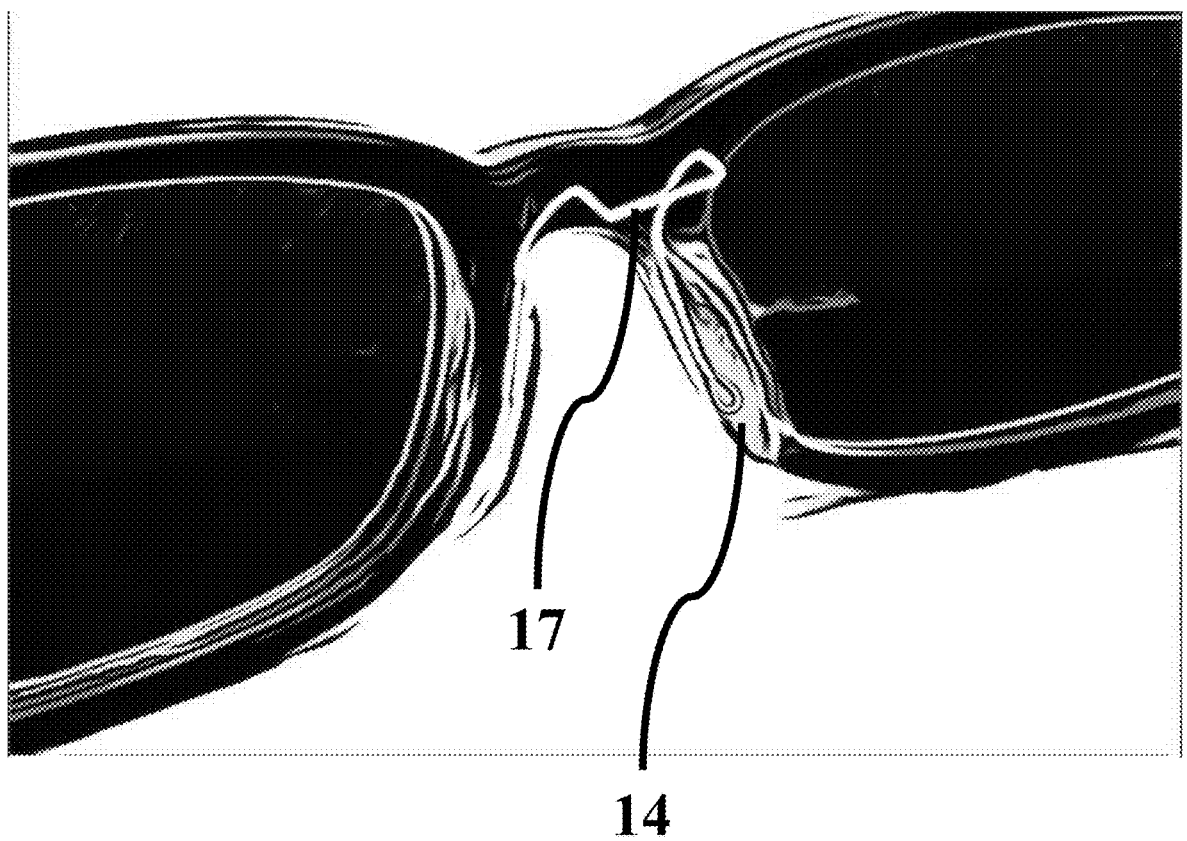
FIG. 7 shows the invention in FIG. 5 attached to a pair of sunglasses of a different frame construction and configuration than what was shown in FIG. 3.

In this claimed alternative version of the embodiment of the invention depicted at FIGS. 5 and 6, there are no knees at the baseline of the invention as depicted in FIGS. 1a and 1b. The stems at FIG. 1(a) at [4.1] either terminate at the baseline, or extend below the baseline and terminate, as depicted in FIG. 5 at [13]; the point at which they terminate being only a termination point or which form into feet as described herein earlier. This alternative configuration of the invention is formed to accommodate sunglasses that have frames with no nose pad arms; where the nose pads are formed from the material of the sunglasses frame, as depicted by the sunglasses in FIG. 7 at [14]. For this form of sunglasses, an idealized version of this alternative configuration of the invention could have the feet in material as depicted in FIG. 5 at [15], similar to as described earlier, or not at all. The material encasing the feet can either be sticky, or have an adhesive applied, so that the feet can adhere and stick to the nose pads formed from the frame of the sunglasses, as depicted in FIG. 7 at [14]. If no material is used, alternative, a clip can be fashioned as the feet, to clip to the sunglasses frame at any area that allows the hook to be central to the sunglasses so that it can be hooked to the prescription eyewear.

The formation of the hook in this version of the invention, depicted in FIG. 6 at [16], and FIG. 7 at [17] is formed similarly to that described as the idealized version of the invention, as depicted in FIG. 3 at [12] and FIG. 2 at [10]. Again, this hook of this alternative embodiment of the invention provides the same or similar function described previously, whereby the bridge of the prescription eyewear fits into the throat of the hook so that the sunglasses will be securely connected to the prescription eyewear. FIG. 4 depicts at [5] how the hook of this alternative embodiment of the invention would securely hook to the prescription eyewear.

Figure 8:
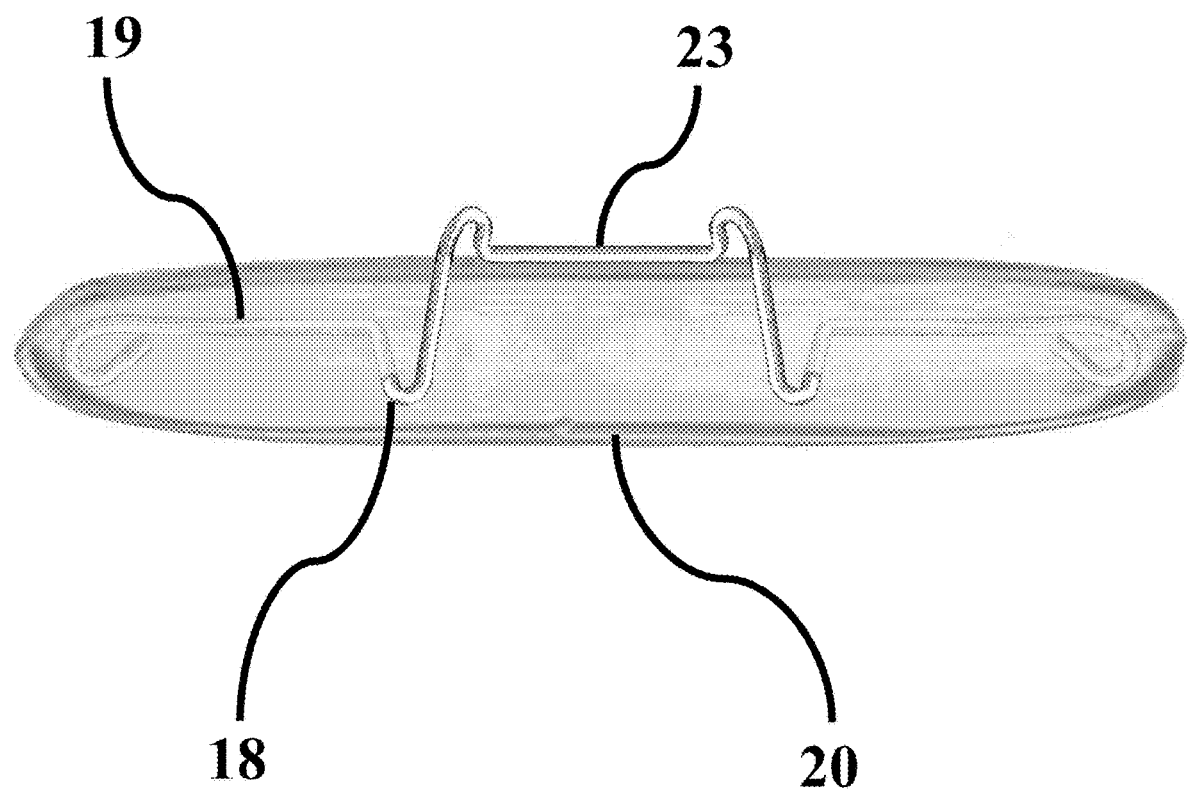
FIG. 8 shows an alternative embodiment of the invention depicted in FIG. 1, in a slightly different configuration than both FIG. 1 and FIG. 5, and with the invention's legs and feet encased in material.
Figure 9:
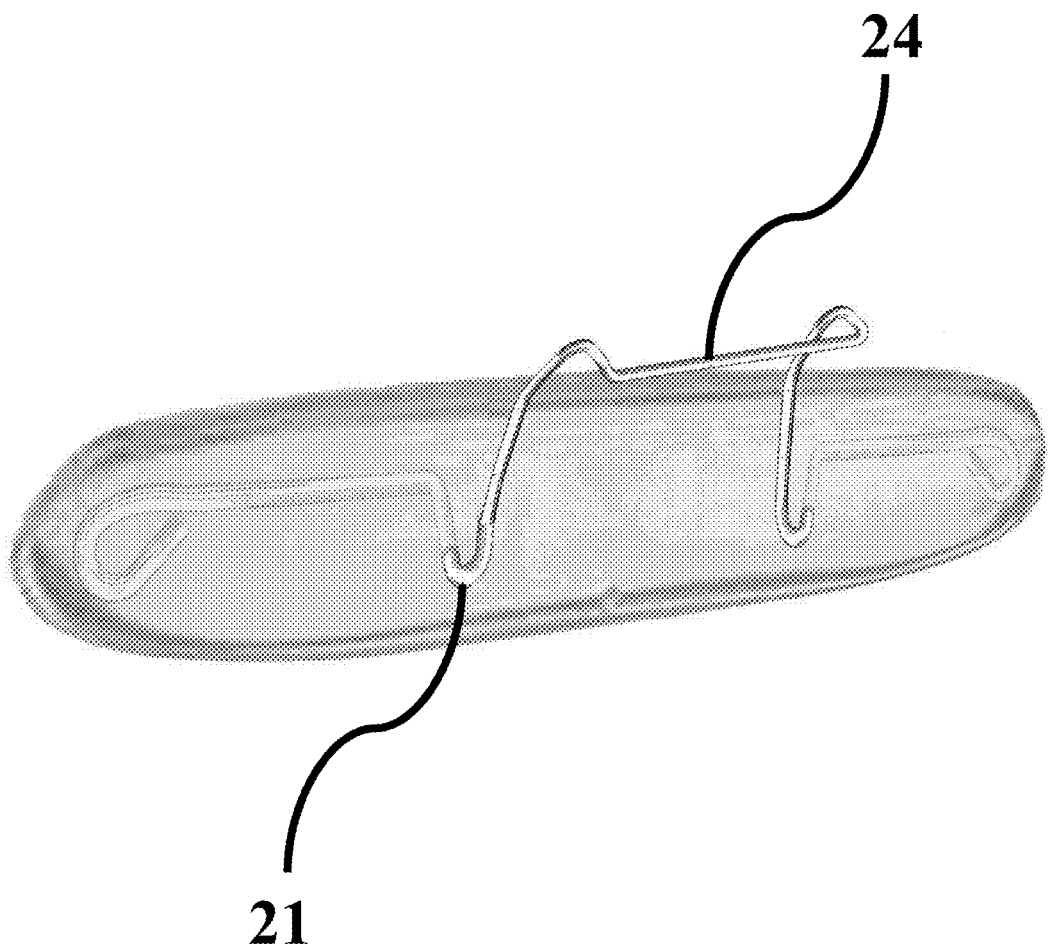
FIG. 9 shows the invention in FIG. 8 from a three-quarter angle.

FIGS. 8 and 9 show another alternative embodiment of the invention that is claimed, configured for sunglasses with frames that are too thick to allow the embodiments of the invention depicted in FIGS. 1, 2, 5 and 6 to reach the bridge of the prescription eyewear if clasped to nose pad arms, or if connected to the sunglasses nose pad molded from the frame. This alternative embodiment of the invention allows the invention to attach directly to the frame of the sunglasses, at a bridge constructed to be wide, or where there is no frame and the sunglasses are ear stems connected to a single lens formed as the sunglasses (similar to the sunglasses depicted in FIG. 10), or other configurations which would not accommodate the invention depicted in FIGS. 1, 2, 5 and 6.

FIG. 8 shows an idealized version of this alternative embodiment of the invention. A main difference of this embodiment from those depicted in FIGS. 1, 2, 5 and 6 is that, though the wire is bent similarly to how it is depicted in FIG. 1 and, where, at the baseline, the wire bends to form the knees, however, the knees of this alternative embodiment of the invention do not form a clasp as described previously, but are bent back and to the side (as depicted in FIG. 8 at [18]) to configure the legs (and feet) of the invention to be fixed perpendicularly to the stems in opposite directions (as depicted in FIG. 8 at [19]). The legs and feet are preferably encased in a material (as depicted in FIG. 8 at [20]).

FIG. 9 shows this same alternative embodiment of the invention from a three-quarters angle, showing at [21] the wire bending at the knees, back from the invention so that the legs and feet depicted in FIG. 8 at [19] can encased entirely by the material.

Figure 10:
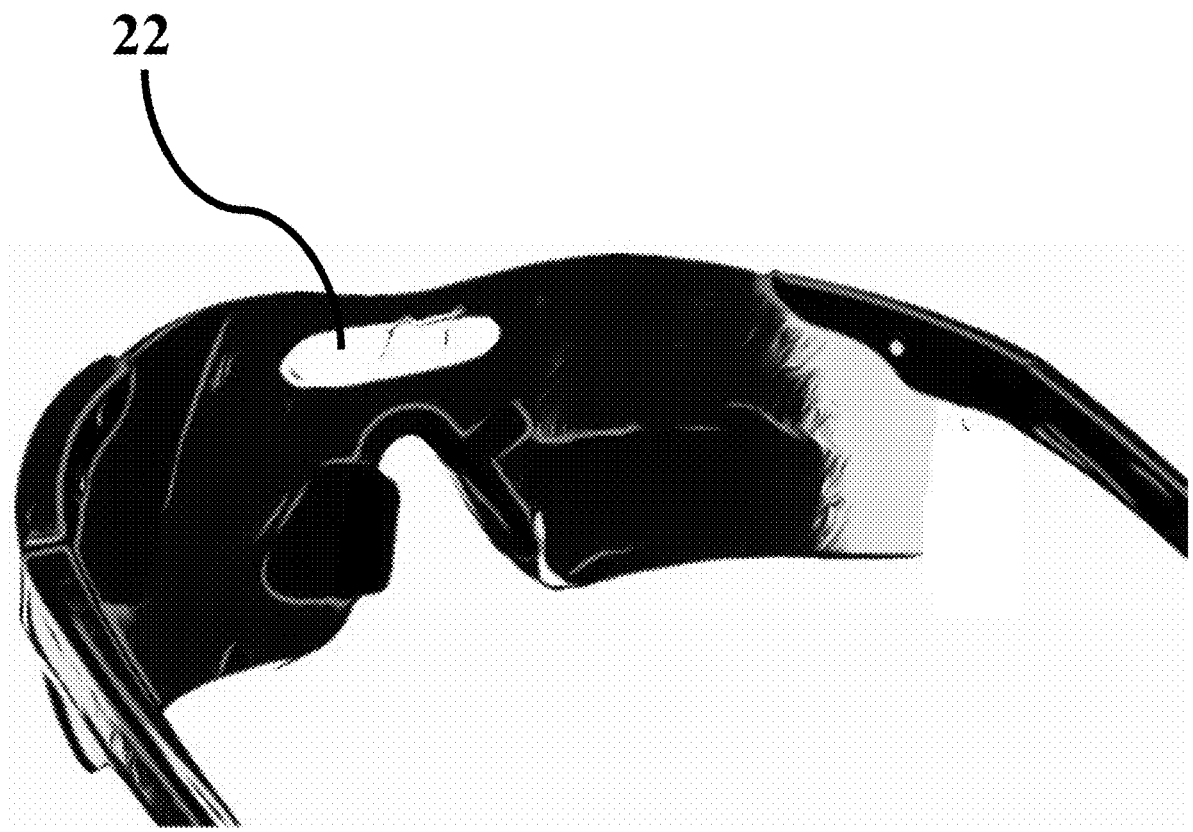
FIG. 10 shows the invention in FIG. 5 attached to a pair of sunglasses with a different frame construction and configuration than what was shown in FIG. 3 and FIG. 7.

The material can be, in this alternative embodiment of the invention, flattened to maximize its surface coverage of the sunglasses, and can have adhesive properties, or can have adhesive applied, in particular that portion of the material that touches the sunglasses, so that it can fasten or stick or attach to the sunglasses frame or lens(es), as depicted in FIG. 10 at [22].

The hook structure of this embodiment, depicted in FIG. 8 at [23] and FIG. 9 at [24] are the same or similar in function to the hook structures described and depicted for the other embodiments described herein. After attachment to the sunglasses, the sunglasses are placed over prescription eyewear and the bridge of the prescription eyewear is cased to be inserted into the throat of the hook, which cause the sunglasses to connect to and placed over the prescription eyewear.

However, as with all of the embodiments of the invention, the wire can be bent to form various structures that are hook-like, all of which are claimed for the invention. Relevant is that the hook of this embodiment, and all embodiments, are formed and configured so that the bridge of the prescription eyewear can fit into the throat of the hook and be connected to the sunglasses, as depicted in FIG. 4 at [5], of any size, shape, type, brand or style; and relevant is that the invention is attached in some fashion to any form and shape of sunglasses, such configuration taking a form such as that depicted in FIGS. 1 and 2, FIGS. 5 and 6, and FIGS. 8 and 9, which are only examples of mechanisms to connect and/or attach to sunglasses of any size, shape, type, brand or style.

Other versions of the invention are perceived and claimed, such as the hook portion of the invention (which extends out from the knees of the invention, as described) attached to the sunglasses by a clipping apparatus, rather than using an embodiment that has legs, knees and feet. Such clipping apparatus either clasping or grasping to the bridge of the sunglasses, or to the interior portion of the sunglasses frame encasing the sunglasses lenses (between the lenses and above where the wearer's nose would be), or the hook portion of the invention can be constructed as part, or to be part, of the frame when the sunglasses are constructed (and the hook may be adjustable so that it can be hidden when not in use). One of the primary differences of this invention from all other inventions described herein (and others similar) is that it allows for the wearer to wear any sunglasses of any type, brand, formation, construction or configuration purchased at any store (in real life or online) over existing prescription eyewear, without the need for specialized prescription eyewear lenses, tinted lens attachments that clip onto the prescription eyewear frame and over the prescription lenses, sunglasses with molded frames to fit around and over prescription eyewear, prescription lenses treated to tint based on the intensity of environment light, or sunglasses with tinted prescription lenses. With this invention, any sunglasses maybe used with and over the prescription eyewear, as it is removable from the sunglasses and can be interchanged between sunglasses at the wearer's preference.

All embodiments of the invention described herein are optimized to allow sunglasses of any size, shape, type, brand or style to be placed over and fastened to prescription eyewear so that the wearer is not limited to specialty sunglasses, specialty attachments for the prescription eyewear, specialty prescription lenses or prescription sunglasses for use.

The following claims are thus to be understood to include what is specifically illustrated and described above, what is conceptually equivalent, what can be obviously substituted and also what incorporates the essential features of the invention. Those skilled in the art will appreciate that various adaptions and modifications of the just-described preferred embodiments can be configured without departing from the scope of the invention. The illustrated embodiments have been set forth only for the purposes of example and that should not be taken as limiting the invention. Within the scope of the appended claims, the invention may be practiced other than as specifically described above.

What is claimed:

1. A device for connecting non-prescription, sun-protective eyewear standardly constructed with a tinted and/or treated lens or lenses, with or without a frame, with nose pad arms and nose pads, and ear stems so that is worn on the face, of any make, model, construction or shape, and which is commonly purchased in the market, to a separate and standardly constructed prescription eyewear constructed with prescription lenses, with or without a frame, with nose pad an arms to hold them, and ear stems so that is worn on the face, of any make, model, construction or shape worn on the face, so that the two eyewear apparatuses, which are not intended to be worn at the same time, are able to be worn at the same time, one over the other (i.e. layered), without altering the sun-protective eyewear and where the ear stems of both the sun-protective eyewear and the prescription eyewear are placed on the ears of the wearer at the same time and as intended by their construction, wherein the device construction comprises: parallel structures connected by a torsion bridge, each parallel structure having a mirror-imaged configuration; the torsion bridge forming a crossbar connecting the parallel structures; the torsion bridge bending at opposite ends upward and then bending or curving back and downward, forming the cap height so that the torsion bridge becomes the point of a hook comprising a throat which creates a space into which the bridge of a prescription eyewear will fit so that the device clings to it; the cap height forming into paralleled stems, which are structures that extend usually downward from the cap height, to create the throat of the hook described above; the stems bending at equal parallel points opposite the cap height, to form paralleled and mirrored baseline structures having a non-enclosed counter surrounding a negative space or "bowl"; the bowl of the baselines configured into non-enclosed counters that are U-shaped, or are an incomplete O-shape, or are an incomplete square shape, into which the arms of nose pads of protective eyewear is be latched so that the device, as a whole, is affixed to protective eyewear that is normally worn independently on the face, in the standard manner, and without other apparatuses; the paralleled baselines extending to form perpendicular leg structures, which are to be angled at any degree optimal to facilitating the device's function as predetermined in the device's construction, but subject to adjustment to the desire of the individual user; the legs extending or otherwise forming into feet structures, where the leg terminates at the outer points of the device, such terminal either being an enclosed or non-enclosed counter, a serif of any angle or shape, or no serif at all and only a straight leg to a terminal point, such that the feet will bracing against the lens or lenses, or the frame, of the protective eyewear to which it is affixed as a means of bracing the device to the protective eyewear, adding additional and firmer affixation of the bowl portion of the device to the nose pad arms of the protective eyewear, and to provide stability to the protective eyewear when it is placed over prescription eyewear with ear stems extended so they rest on the user's ears along with the prescription eyewear's ear stems, and connected thereto by application of the device's hook structure placed over and gripping to the bridge of the prescription eyewear to effectively layer the protective eyewear over the prescription eyewear and preventing the protective eyewear from slipping down and off the nose.

2. The device in claim 1 wherein the torsion bridge is a cross bar between the paralleled structures of the device, and forms the hook structure of the device.

3. The device in claim 1 wherein the hook is formed by a bend upward at each opposite end of the torsion bar, and bends again in a rounded or straight-edged structure in a downward direction to form the cap height, also to form the throat of the hook, which is the gape of the hook into which the bridge of any prescription eyewear will fit for the device to grip it and also to from the stems.

4. The device in claim 1 wherein the stems are either straight or slightly curved to any optimized degree to facilitate the hooking formation and performance, are perpendicular at any degree to the arms of the hook or angled in or out based on user preference, and are bendable forward or back, each of the alternative angled positions subject to user preference and achieved by the user by applying pressure with the fingers of the hands to cause the resilient material from which the device is made and formed to angle from the corners of the device, and/or the arms of the hook, to any desired degree within and outside the coplanar area of the device.

5. The device in claim 1 wherein each baseline located at the ends of the stems opposite the cap height, bends into non-enclosed counters that are U-shaped, or are an incomplete O-shape, or are an incomplete square shape, containing a bowl to form the legs; wherein the structures of sunglasses, such as, nose pad arms or similarly constructed structures at the nose of the sunglasses, are fitted through the gap of the non-enclosed counters, and into the bowl, so that the device clasps or clings to the sunglasses nose pad arms or other sunglasses frame structure.

6. The device in claim 1 wherein the legs extend from the baseline in mirrored direction, away from the parallel stems, and which have feet that are a straight terminus, or a serif formed as an angle to any degree, or a closed or non-closed counter, and which pushes against the sunglasses frame or lens either by the feet having direct contact with the frame or lens, or the feet having been encased in a soft and rubbery material, flattened on the side facing the sunglasses to lie flat on the sunglasses surface, on either the frame of the lens, and the flat side having adhesive or non-adhesive properties, or adhesive material applied to the soft material, where the adhesive properties or material will allow the device feet to secure to one spot on the sunglasses that is optimal to securing the device the sunglasses as subject to use preference.

7. The device in claim 1 further comprising a first alternative configuration where the hook structure of the device is the same, but configures alternatively at the corners of the stems where the corner is eliminated and there is no baseline bend or clasping mechanism formation; where the stems are configured in such an alternative way in which each parallel stem does not bend at the baseline, but each continues to extend down to a terminal point; where the terminal point forms the feet of the device; where the terminals of the feet of either stem are either an enclosed or non-enclosed counter, a serif of any angle degree or shape, or no serif at all and only a straight leg to a terminal point; where the feet of both stems are encased in a soft and rubbery material that is either adhesive or non-adhesive, or has adhesive applied to the soft material's surface.

8. The device in claim 7, wherein the torsion bridge of the first alternative configuration is a cross bar between the paralleled structures of the device, and is the point of a hook of the device.

9. The device in claim 7, wherein the book of the first alternative is formed by a bend upward at opposite ends of the torsion bar to form the cap height which is the gape of the hook into which the bridge of prescription eyewear fits for the device to grip it and to form stems.

10. The device in claim 7, wherein the stems of the first alternative configuration are either straight or slightly curved to any optimized degree to facilitate the hooking formation and performance, are be perpendicular to the arms of the hook or angled in or out based on user preference, and are bent forward or back, each of the alternative angled position subject to user preference and achieved by the user by applying pressure with the fingers of the hands to cause the resilient material from which the device is made and formed to angle from the corners of the device, and/or the arms of the hook, to any desired degree within and outside the coplanar area of the device.

11. The device in claim 7, wherein the stems of the first alternative configuration extend downward from the arms of the hook, to feet that are a straight terminus, or a serif formed as an angle to any degree, or a closed or non-closed counter, and which pushes against the sunglasses frame or lens.

12. The device in claim 1, further comprising a second alternative configuration where the hook structure of the device is the same, but configures alternative at the corners of the stems wherein the feet are encased in a soft and rubbery material, flattened on the exterior planar of the device, and angled so that they are placed flatly against the interior portion of nose pads formed from the material used to form the sunglasses frame.

13. The device in claim 12, wherein the soft material of the second alternative configuration comprises either non-adhesive or adhesive properties or materials applied to the exterior flat portion of the material so the adhesive materials or properties allow the device to adhere to the nose pads formed from the material of the sunglasses frame, in order for the device to secure to the sunglasses frame.

14. The device in claim 12, wherein the torsion bridge of the second alternative configuration forms hook structure by bending upward at opposite ends of the torsion bridge and then back down to create the cap height; where stems extend down from the cap height to a baseline except bent in direction opposite to the hook's direction; where the legs extend from the baseline to form legs that are perpendicular to the stems in a mirrored manner; where each leg terminates at the outside the planar of the hook and stems, such terminal either being an enclosed or non-enclosed counter, a serif of any angle or shape, or no serif at all and only a straight leg to a terminal point; where the legs are encased, up to or just before the bend in the baseline, in a soft and rubber material, either having adhesive properties or having an adhesive material applied, and said soft material extending from one foot of the device to the other, and a small length beyond, or, alternatively, encasing the entirety of each leg and foot, and said soft material in either case having a thickness to encase the entirety of the legs and feet with no part of either exposed to the open air, and the encasement thickness being no greater than the bend at the baseline.

15. The device in claim 12, wherein the torsion bridge of the second alternative configuration is a cross bar between the paralleled structures of the device, and is the point of a hook of the device.

16. The device in claim 12, wherein the look of the second alternative configuration is formed by a bend at the cap height of the stems to form arms that connect to the torsion bridge, and form the throat which is the gape of the hook into which the bridge of prescription eyewear fits for the device to grip it.

17. The device in claim 12, wherein the stems of the second alternative configuration are either straight or slightly curved to any optimized degree to facilitate the hooking formation and performance, are be perpendicular to the arms of the hook or angled in or out based on user preference, and are bent forward or back, each of the alternative angled position subject to user preference and achieved by the user by applying pressure with the fingers of the hands to cause the resilient material from which the device is made and formed to angle from the corners of the device, and/or the arms of the hook, to any desired degree within and outside the coplanar area of the device.

18. The device in claim 12, wherein the bends at the corners of the L shapes of second alternative configuration bend in the opposite direction as the hook point, to bend again at the baseline to cause the legs of the device to extend outward perpendicularly from the stems of the device.

19. The device in claim 12, wherein the torsion bridge of the second alternative configuration are encased in a strip of soft rubbery material that will encase the entirety of the legs and the feet, with a thickness that extends no further than the bend at the corner to the stems, and is flattened.

\* \* \* \* \*